United States Patent
Rice

[11] 3,791,203
[45] Feb. 12, 1974

[54] METHOD FOR MEASURING TORSIONAL VIBRATION
[75] Inventor: Keith E. Rice, Erie, Pa.
[73] Assignee: General Electric Company, Erie, Pa.
[22] Filed: Jan. 3, 1972
[21] Appl. No.: 214,907

[52] U.S. Cl. .................................. 73/70.1, 73/71.4
[51] Int. Cl. ............................................ G01n 29/00
[58] Field of Search ............................ 73/70.1, 71.4

[56] References Cited
UNITED STATES PATENTS
3,561,261   2/1971   Conniff et al. ...................... 73/70.1
2,365,218   12/1944  Rogers ................................ 73/71.4

Primary Examiner—Richard C. Queisser
Assistant Examiner—Arthur E. Korkosz
Attorney, Agent, or Firm—Walter C. Bernkopf; Dana F. Bigelow

[57] ABSTRACT

A method for measuring torsional vibration of a rotating horizontal shaft having no free end for attachment thereto. A pair of matched accelerometers are diametrically mounted on a hub of the shaft and their summed outputs analyzed to obtain a representative value of the torsional vibration in the rotating shaft. The diametric relationship of the pair eliminates any error which would be introduced by the effects of gravity acting on a single accelerometer.

3 Claims, 4 Drawing Figures

PATENTED FEB 12 1974 3,791,203

METHOD FOR MEASURING TORSIONAL VIBRATION

BACKGROUND OF THE INVENTION

This invention relates generally to vibration measuring devices and more particularly to a method for electrically measuring torsional vibration in a rotating shaft.

Torsional vibration of rotating shafts has long been a problem with which to contend. Accordingly, an analysis is often required of a particular shaft application to determine its unique characteristics under specified load and speed conditions. An adequate study may require the determination of torsional vibrations within a complete spectrum of transient frequencies occurring at each of a plurality of speeds.

It has been common practice in the art to express torsional vibration in terms of displacement as defined by values of frequency and amplitude. Such an expression can be obtained by direct mechanical measurement, or by a measurement of acceleration which is double integrated to provide the associated displacement values. A mechanical apparatus is inadequate because of the lack of precision thereof, and the impractical manner in which the results are expressed, as for example, in a strip chart recorder where the results cannot be reduced by electronic analysis.

A known method for electronically reducing torsional behavior involves the mounting of a transducer on the end of the shaft and generating signals in response to the rotation thereof. However, there are often situations wherein a shaft end is not free in its operational condition, and where removal of the load to gain access to a free end causes a change in the chracteristics and prevents an accurate analysis of the torsional behavior of the shaft.

For example, a common practice in the maintenance and testing of large locomotive diesel engines requires a periodic (every 5 or 6 years) disassembly and removal of the vibration damping system for extensive testing to determine the suitability of its condition. At present there is no adequate technique or apparatus available for field testing the equipment in its assembled condition.

Vibrational analyses of shafts having no free end can be made by the attachment of an accelerometer to the shaft and using telemetry to derive an electrical output which is then analyzed to obtain the desired form of representative data. When applied to a vertical shaft the forces of gravity are constant with respect to the accelerometer, and no error is introduced thereby. However, when applied to a horizontal shaft, such as on a locomotive, the force of gravity acts on the accelerometer to introduce an input varying from + 1G to − 1G for each revolution of the shaft. An indication of the degree of torsional vibration can thus be obtained by this method, but a comprehensive analysis over a range of frequencies and speeds is extremely difficult when the gravity induced error is considered. The fact that the force of gravity remains constant while the amplitude of the torsional vibrations varies with the speed of shaft rotation, makes a mathematical solution extremely complicated, especially when the results are expressed in terms of displacement.

It is therefore an object of this invention to provide an improved method of measuring torsional vibration on a rotating shaft.

Another object of this invention is the provision for measuring torsional vibration in a shaft offering no free end.

Yet another object of this invention is the provision for obtaining an accurate electrical representation of torsional vibration in a rotating shaft.

Still another object of this invention is the provision for eliminating the effects of gravity in measuring torsional vibration of a horizontal shaft.

A further object of this invention is the provision for a method and apparatus for measuring torsional vibration in a rotating horizontal shaft, which method and apparatus is simple, accurate, and economical to use.

These objects and other features and advantages become more readily apparent upon reference to the following description when taken in conjunction with the appended drawings.

SUMMARY OF THE INVENTION

This invention employs two piezoelectric accelerometers mounted diametrically on a moment arm of a horizontal shaft, in perpendicular relationship to both the moment arm and the axis of rotation. As the shaft rotates, the outputs of the two accelerometers are summed and the results analyzed to obtain a representative value of the torsional vibration within the shaft. The effects of gravity acting on the accelerometers to introduce a variable error into each, are canceled by the summing process, since the errors are equal and opposite at all times. An accurate electrical readout of the torsional vibration can thus be obtained on a shaft having no free end.

In the drawings as hereinafter described a preferred embodiment is depicted; however, various other modifications and alternate constructions can be made thereto without departing from the true spirit and scope of the invention.

DESCRIPTION OF THE PREFERRED EMBODIMENT

Figure 1:
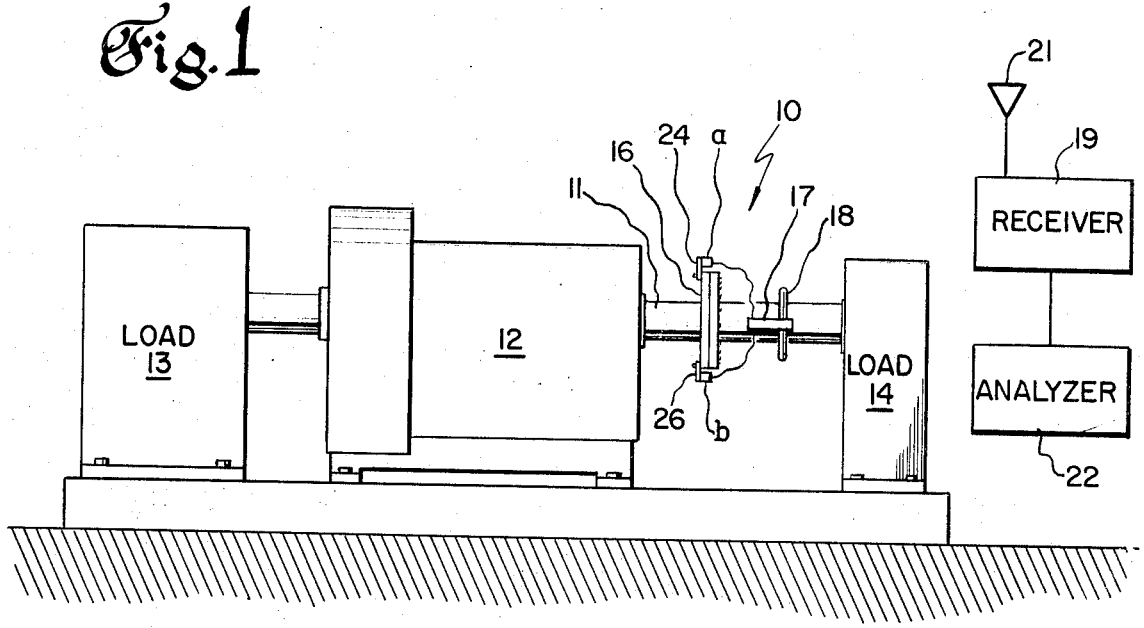
FIG. 1 is a schematic of a typical engine drive-shaft arrangement to which application of this invention is well suited.

Reference is now made to FIG. 1 wherein a measuring apparatus 10 is installed for use in measuring the torsional vibration in a drive shaft 11 having no free end for attachment thereto.

A typical drive system is of the type having an engine 12 operably connected at its drive shaft 11 to a principle load 13 on one end thereof and to a secondary load 14 on the opposite end thereof. Such an arrangement is used, for example, on a diesel-electric locomotive wherein a diesel engine drives an alternator on one end of its shaft and various auxiliary machinery on the other end thereof. The unique condition is that of having no free end on the drive shaft for connection thereto in analyzing its vibrational behavior during operation of the system.

A pair of aligned coupling flanges 16 are provided to facilitate disassembly of the system, and access to a shaft free-end can be gained by uncoupling such an arrangement. However, the uncoupling of the load 14 will change the vibrational characteristics of the drive shaft 11, and an accurate analysis cannot be made of the shaft behavior when the load 14 is removed.

Measurement of the shaft torsional vibration with the system in its normal operating condition, can be accomplished in accordance with this invention. In one embodiment thereof, a pair of piezoelectric accelerometers, $a$ and $b$, are diametrically attached to the coupling flanges 16, and their generated outputs fed into a responsive transmission unit 17 having an antennae 18. A receiver 19 picks up the transmitted signal through its antennae 21 and provides an analyzer 22 with the representative signals, which it breaks down into data indicative of shaft vibrational behavior.

Figure 2:
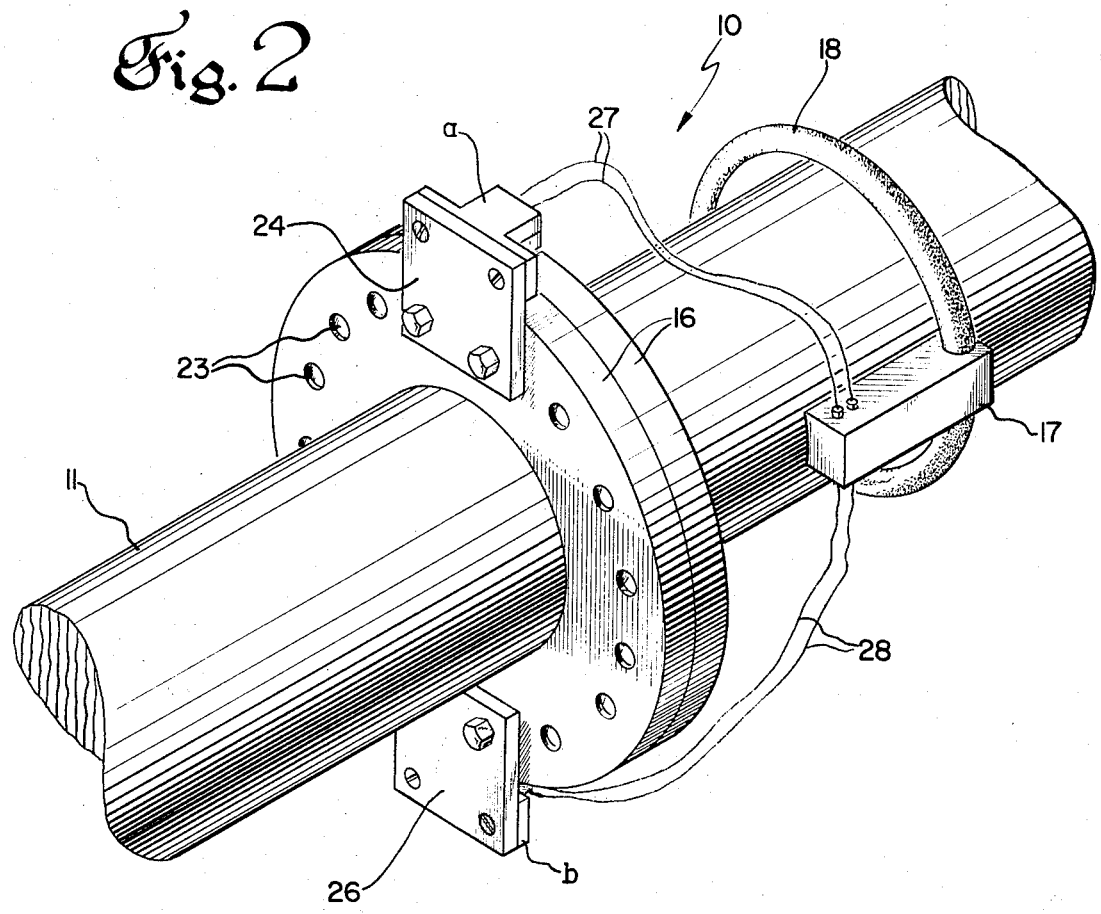
FIG. 2 is a perspective view illustrating the measuring apparatus installed in accordance with the preferred embodiment of the invention.

A particular embodiment of the measuring apparatus 10 is shown more clearly in FIG. 2. The coupling flanges 16 are each integrally connected to a portion of the drive shaft 11 and mutually fastened by a plurality of studs 23. Other means may be employed where no coupling flanges exist as part of the drive mechanism. For example, where only a continuous shaft portion is accessible a collar may be attached thereto for use as a moment arm.

Radially displaced on the flanges 16 are a pair of brackets 24 and 26, attached thereto in diametric relationship by the studs 23 or other suitable means. The precise location of the brackets is important insofar as the relative dispositions of the accelerometer $a$ and $b$, which are installed on the brackets 24 and 26 respectively, are critical for the proper operation of the apparatus as contemplated in this invention. The manner of attaching the accelerometers to the brackets is by a screw arrangement or the like.

The accelerometers $a$ and $b$ are disposed in diametric relationship with respect to the shaft 11 and are aligned perpendicular to the axis of rotation and in tangential relationhip to their path of rotation. Their radial displacements with respect to the shaft are preferably equal for reasons discussed hereinafter.

Electrical leads 27 and 28 couple the accelerometers $a$ and $b$, respectively, to the transmission unit 17, and carry their respective generated signals thereto. In response to the signals, the transmission unit 17, which is attached to the rotating shaft 11, emits signals to the antenna 18 for subsequent analysis.

Figure 3:
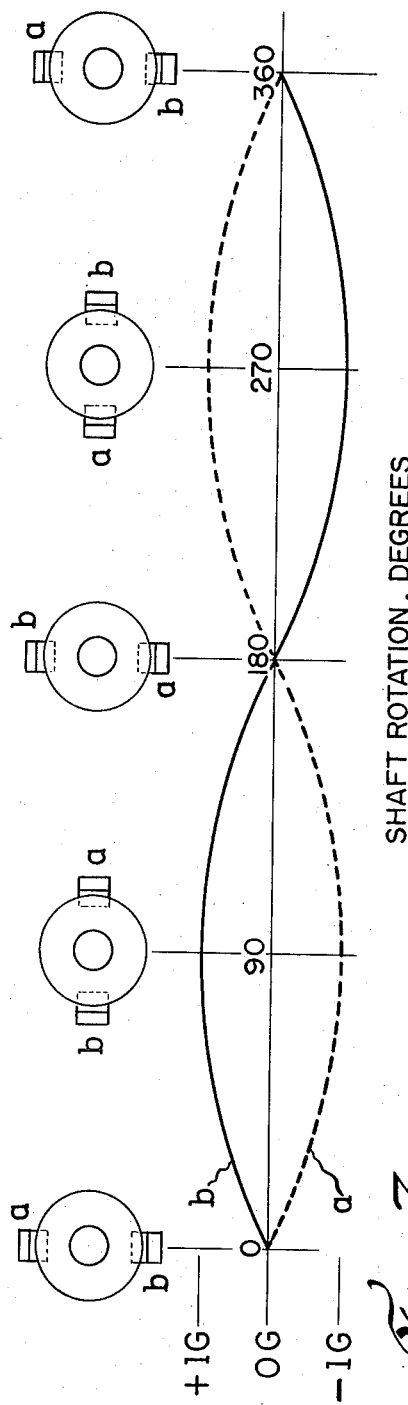
FIG. 3 is a graphic illustration of the simultaneous outputs of the accelerometers when used in accordance with the preferred embodiment.

The effects of gravity as they relate to the accelerometer's positions during a cycle of shaft rotation are shown in FIG. 3. At the 0° position, when both are aligned in a horizontal disposition, the force of gravity does not affect their output. As they rotate in a clockwise direction the forces as effected by gravity increase to a maximum of 1G at the 90° position. At that point the accelerometers $a$ and $b$ have forces acting thereon of −1G and +1G, respectively, irrespective of their acceleration or torsional vibration. If only a single accelerometer were used the generated accelerometer signal, representative of the fundamental frequency (1 cycle/RPM) of torsional vibration, would be affected by this value as a variable error factor.

However, if a pair of matched accelerometers are used as suggested and their outputs summed, the respective errors introduced will be equal and opposite and will tend to cancel each other out as shown in FIG. 3.

Piezoelectric accelerometers are extremely sensitive, and the effects of gravity on a pair will result in the shown balancing behavior only if they are a matched pair, i.e., if their calibration values are substantially equal, and if their radial displacements from the axis of rotation are equal. Otherwise, the outputs must be balanced electronically by adjusting the respective gains or the like.

Figure 4:
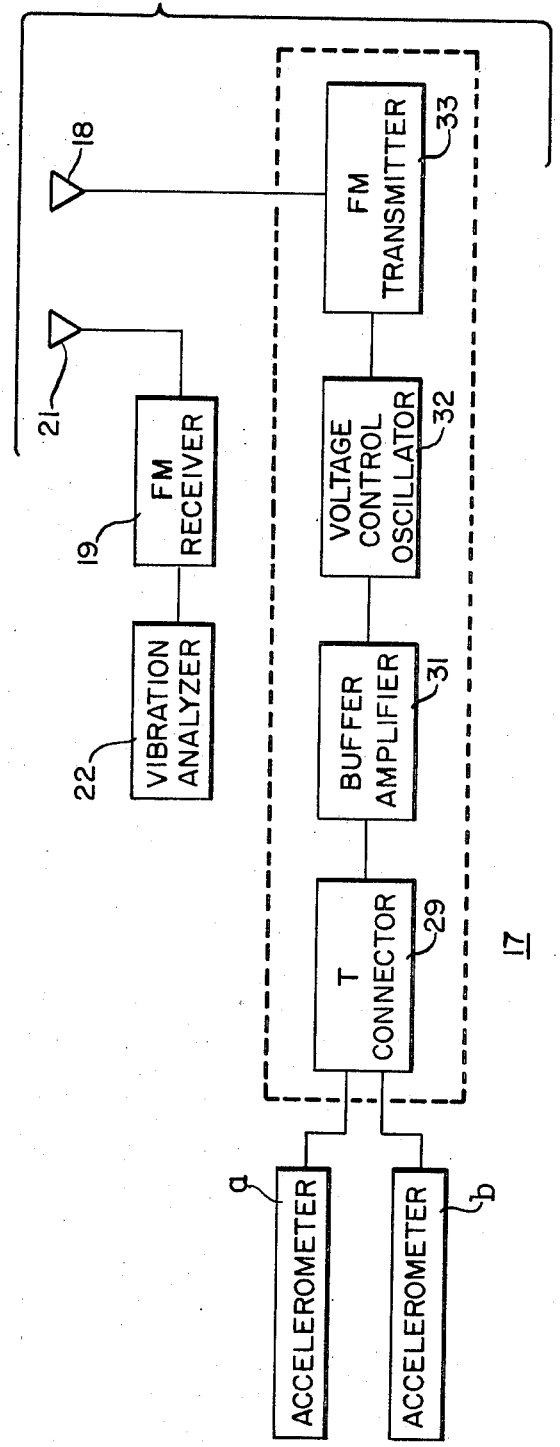
FIG. 4 is a schematic illustration of a typical process and apparatus for vibrational analysis as applied to this invention.

FIG. 4 is a schematic illustration of a known telemetry arrangement for use in reducing the accelerometer outputs to the desired vibrational readout data.

Accelerometers $a$ and $b$ are coupled in parallel to a T-connector 29 which sums the signals and passes them through a buffer amplifier 31 which isolates the assembly from the voltage control oscillator 32. If the accelerometers are not matched, or if they are not displaced equal distances from the axis of rotation then their outputs can be passed through separate buffer amplifiers whose respective gains are adjusted to obtain the desired balancing effect.

In response to the buffer amplifier(s) voltage output, the voltage control oscillator 32 drives an FM transmitter at a corresponding frequency. The signal is picked up by the FM receiver 19 and analyzed by the vibrational analyzer 22 in a manner well known in the art.

Since the error caused by gravity is eliminated, the results may be double integrated in the analyzer to provide the desired accurate displacement values without the solving of complicated mathematical functions.

What I claim as new and desire to secure by Letters Patent of the United States:

1. A method of measuring torsional vibration of a rotatable horizontal shaft, the method comprising:
   a. attaching a pair of piezoelectric accelerometers to a moment arm of the shaft in diametric relationship to the axis of rotation, each of said accelerometers being aligned perpendicular to the axis of rotation and in tangential relationship to their path of rotation;
   b. rotating the shaft at a speed for which value determinations are desired;
   c. summing the outputs of said pair of accelerometers, whereby the effects of gravity acting thereon are mutually canceled; and
   d. analyzing the summation to obtain values indicative of the torsional vibration within the shaft.

2. A method of measuring torsional vibration as set forth in claim 1 wherein said pair of accelerometers are radially displaced an equal distance from the axis of rotation, thereby providing for the identical reactions to torsional vibration within the shaft.

3. A method as set forth in claim 2 wherein said pair of accelerometers is a matched pair, whereby, ignoring the effects of gravity, identical electrical signals will be generated therein during periods of acceleration of shaft rotation.

* * * * *